US012692177B2

(12) United States Patent
Andrews et al.

(10) Patent No.: US 12,692,177 B2
(45) Date of Patent: Jul. 28, 2026

(54) VACUUM AIR LIFT SYSTEMS INCLUDING A FLUIDIC OSCILLATOR

(71) Applicant: Searen, LLC, Cincinnati, OH (US)

(72) Inventors: Thomas Wood Andrews, Cincinnati, OH (US); Emmanuel Pierre Pascal Briquet, Cincinnati, OH (US); John Rodgers Brooks, Jr., Cincinnati, OH (US)

(73) Assignee: Searen, LLC, Cincinnati, OH (US)

( * ) Notice: Subject to any disclaimer, the term of this patent is extended or adjusted under 35 U.S.C. 154(b) by 316 days.

(21) Appl. No.: 18/234,658

(22) Filed: Aug. 16, 2023

(65) Prior Publication Data

US 2023/0391637 A1     Dec. 7, 2023

Related U.S. Application Data

(63) Continuation of application No. 17/496,372, filed on Oct. 7, 2021, now Pat. No. 11,767,235, which is a
(Continued)

(51) Int. Cl.
C02F 1/20          (2023.01)
C02F 1/74          (2023.01)
(Continued)

(52) U.S. Cl.
CPC ................ C02F 1/20 (2013.01); C02F 3/085 (2013.01); C02F 3/223 (2013.01); A01K 63/045 (2013.01);
(Continued)

(58) Field of Classification Search
CPC .. C02F 1/20; C02F 3/085; C02F 3/223; C02F 1/74; C02F 3/087; C02F 3/1268;
(Continued)

(56) References Cited

U.S. PATENT DOCUMENTS 3,968,034 A     7/1976   Tymoszczuk
5,492,624 A     2/1996   Rozich
(Continued)

FOREIGN PATENT DOCUMENTS

DE      102011122695 A1     6/2013
EP          1767498 A1     3/2007
(Continued)

OTHER PUBLICATIONS

Machine-generated English translation of RU 2422380, generated on Oct. 8, 2025.*

(Continued)

*Primary Examiner* — Fred Prince
(74) *Attorney, Agent, or Firm* — FBT Gibbons LLP; Vance V. VanDrake, III; Alexander J. Johnson

(57)          ABSTRACT

A vacuum airlift system for treating an aqueous effluent includes an upflow liquid portion, where the upflow liquid portion is configured to retain a fluid, and a fluid inlet, the fluid inlet being fluidly coupled with the upflow liquid portion, where the fluid inlet is positioned at about a bottom of the upflow liquid portion. The vacuum airlift system can also include a downflow liquid portion, where the downflow liquid portion is fluidly coupled with the upflow liquid portion, and a fluid outlet, the fluid outlet being fluidly coupled with the downflow liquid portion, where the fluid outlet is positioned at about a bottom of the downflow liquid portion. The vacuum airlift system can also include a plurality of aerators fed by one or more fluidic oscillators; the plurality of aerators being coupled to the upflow liquid column.

20 Claims, 11 Drawing Sheets

Related U.S. Application Data continuation of application No. 16/811,031, filed on Mar. 6, 2020, now Pat. No. 11,161,756, which is a continuation of application No. 16/182,092, filed on Nov. 6, 2018, now Pat. No. 10,618,824, which is a continuation of application No. 15/660,564, filed on Jul. 26, 2017, now Pat. No. 10,233,096.

(60) Provisional application No. 62/501,386, filed on May 4, 2017, provisional application No. 62/367,545, filed on Jul. 27, 2016.

(51) Int. Cl.

| | |
|---|---|
| *C02F 3/08* | (2023.01) |
| *C02F 3/12* | (2023.01) |
| *C02F 3/22* | (2023.01) |
| *F04F 3/00* | (2006.01) |
| *A01K 63/04* | (2006.01) |
| *C02F 3/32* | (2023.01) |

(52) U.S. Cl.
CPC ................ *C02F 1/74* (2013.01); *C02F 3/087* (2013.01); *C02F 3/1268* (2013.01); *C02F 3/322* (2013.01); *C02F 2301/063* (2013.01); *F04F 3/00* (2013.01); *Y02W 10/10* (2015.05); *Y02W 10/37* (2015.05)

(58) Field of Classification Search
CPC .. C02F 3/322; C02F 2301/063; A01K 63/045; F04F 3/00; Y02W 10/10; Y02W 10/37
USPC ....... 210/603, 604, 614, 615, 616, 617, 150, 210/151, 167.21, 167.22, 170.09; 119/227
See application file for complete search history.

(56) References Cited

U.S. PATENT DOCUMENTS

| | | | |
|---|---|---|---|
| 5,569,634 | A | 10/1996 | Miller et al. |
| 5,660,142 | A | 8/1997 | Van Rijn |
| 5,849,194 | A | 12/1998 | Yamasaki et al. |
| 6,017,020 | A | 1/2000 | Baughman et al. |
| 6,942,788 | B1 | 9/2005 | Cox et al. |
| 10,233,096 | B2 | 3/2019 | Andrews et al. |
| 10,618,824 | B2 | 4/2020 | Andrews et al. |
| 11,161,756 | B2 | 11/2021 | Andrews et al. |
| 11,767,235 | B2 | 9/2023 | Andrews et al. |
| 2008/0011679 | A1 | 1/2008 | Champagne et al. |
| 2011/0027875 | A1 | 2/2011 | Cathcart |
| 2011/0107664 | A1 | 5/2011 | Rancis et al. |
| 2011/0174730 | A1 | 7/2011 | Chong et al. |
| 2012/0125012 | A1 | 5/2012 | Greer et al. |
| 2015/0264897 | A1 | 9/2015 | Limcaco |
| 2016/0114292 | A1 | 4/2016 | Colby et al. |
| 2017/0081222 | A1 | 3/2017 | Welt |

FOREIGN PATENT DOCUMENTS

| | | | | | |
|---|---|---|---|---|---|
| JP | 2010-196557 | A | | 9/2010 | |
| RU | 2422380 | C1 | * | 6/2011 | |
| RU | 2455239 | C1 | * | 7/2012 | |
| SE | 429011 | B | * | 8/1983 | ............... C02F 3/24 |

OTHER PUBLICATIONS

Machine-generated English translation of RU 2455239, generated on Oct. 8, 2025.*

Machine-generated English translation of SE 429011, generated on Oct. 8, 2025.*

International Search Report and Written Opinion dated Oct. 12, 2017, for International Application No. PCT/US2017/044180, 7 pages.

* cited by examiner

VACUUM AIR LIFT SYSTEMS INCLUDING A FLUIDIC OSCILLATOR

REFERENCE TO RELATED APPLICATIONS

The present application is a continuation application of U.S. patent application Ser. No. 17/496,372, filed Oct. 7, 2021, which is a continuation application of U.S. patent application Ser. No. 16/811,031, filed Mar. 6, 2020, now U.S. Pat. No. 11,161,756, which is a continuation application of U.S. patent application Ser. No. 16/182,092, filed Nov. 6, 2018, now U.S. Pat. No. 10,618,824, issued Apr. 14, 2020, which is a continuation application that claims priority to U.S. patent application Ser. No. 15/660,564, filed Jul. 26, 2017, now U.S. Pat. No. 10,233,096, issued Mar. 19, 2019, which claims priority to U.S. Provisional App. No. 62/367,545, filed Jul. 27, 2016, and U.S. Provisional App. No. 62/501,386, filed May 4, 2017, and hereby incorporates the same applications by reference in their entirety.

TECHNICAL FIELD

Embodiments of the technology relate, in general, to vacuum air lift (VAL) technology and, in particular, to vacuum air lift systems incorporating a fluidic oscillator, biological filter elements, a fluidized bed reactor, a photobioreactor, and/or an independent circulation and particle extraction system.

BACKGROUND

Under the conditions of aquaculture in recirculated aqueous medium, to promote the growth and health of the fish, it is known that it is beneficial to control the dissolved gas concentration of dissolved oxygen, carbon dioxide, and nitrogen.

SUMMARY

Embodiments include a vacuum airlift system for treating an aqueous effluent including an upflow liquid portion, the upflow liquid portion having a top and a bottom, wherein the upflow liquid portion is configured to retain a fluid, and a fluid inlet, the fluid inlet being fluidly coupled with the upflow liquid portion, wherein the fluid inlet is positioned at about the bottom of the upflow liquid portion. The vacuum airlift system can also include a downflow liquid portion, the downflow liquid portion having a top and a bottom, wherein the downflow liquid portion is fluidly coupled with the upflow liquid portion, and a fluid outlet, the fluid outlet being fluidly coupled with the downflow liquid portion, wherein the fluid outlet is positioned at about the bottom of the downflow liquid portion. The vacuum airlift system can also include a plurality of aerators fed by one or more fluidic oscillators; the plurality of aerators being coupled to the upflow liquid column.

BRIEF DESCRIPTION OF THE DRAWINGS

The present disclosure will be more readily understood from a detailed description of some example embodiments taken in conjunction with the following figures.

DETAILED DESCRIPTION

Figure 1:
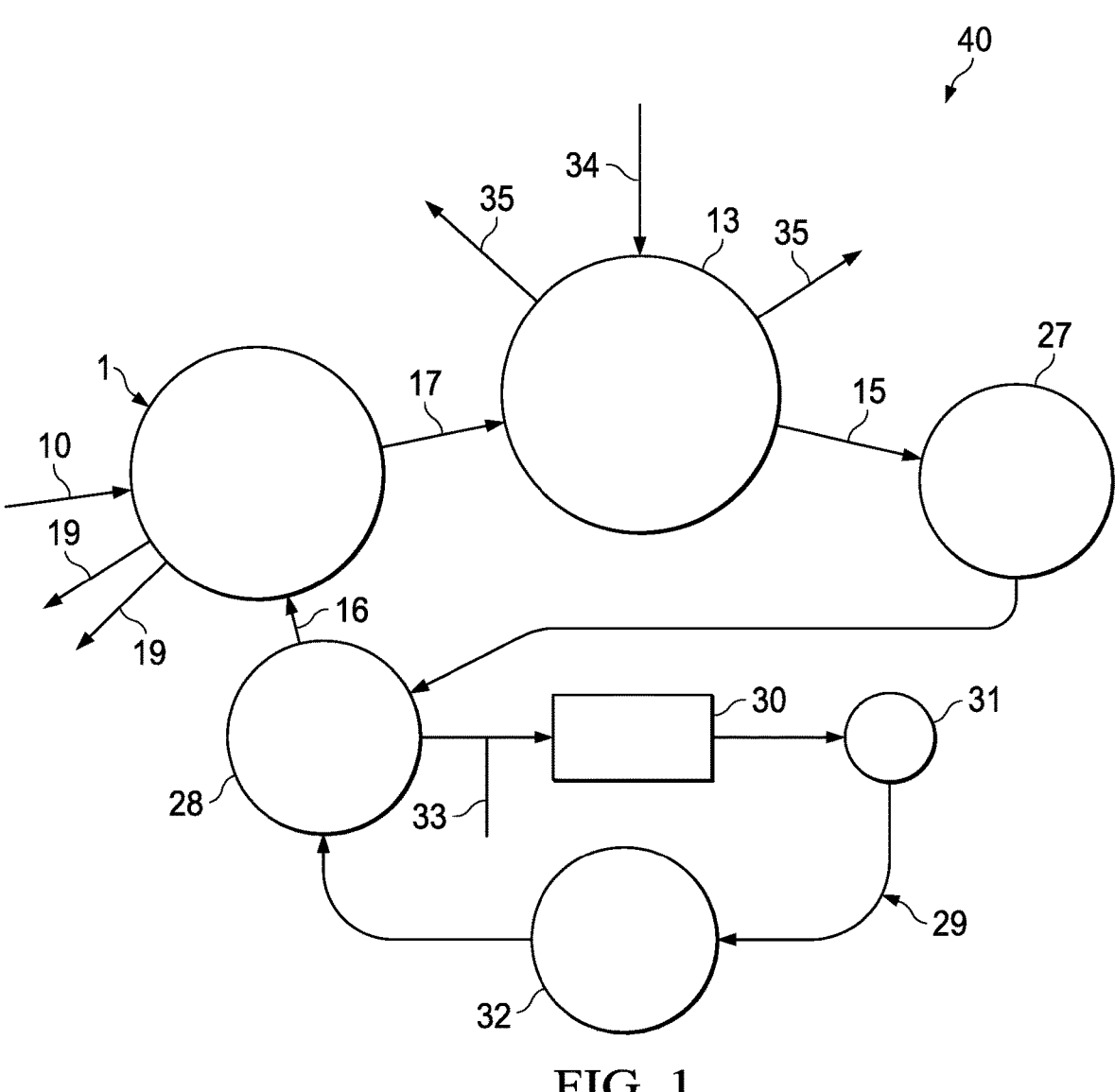
FIG. 1 is a schematic illustration of an aquaculture facility using recirculated aqueous medium according to one embodiment.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Described herein are example embodiments of apparatuses, systems, and methods for vacuum air lift (VAL) systems. Example embodiments described herein can improve the functionality of a VAL system. For example, the VAL system can be a plastic or fiberglass structure approximately 12 to 16 feet tall, for example, that can include a plurality of vertical concentric tubes, such as those shown and described herein. In one example embodiment, bio-film elements can be incorporated into the upflow and/or downflow elements of a VAL system. In some embodiments, a VAL system can include a fluidic oscillator. In some embodiments, a VAL system can include a flow management system.

In example embodiments, the outer or down corner tube of a VAL system can transition into a vertically configured photobioreactor. A water inlet can be provided at the bottom of the inner tube and a water outlet can be provided at or near the top of the outer tube. In example embodiments this water outlet can be directed into any suitable photobioreactor.

Air (or other gases) can feed to an inner tube via a micro-bubble aerator and/or a macro-bubble aerator. Valves can be used to control the airflow through the aerators. A vacuum pump can be connected to a holding tank, where the holding tank can be connected to a cap at the top of the concentric tubes. Level sensors can be used to control water levels within the VAL system. Valves can be used to manage VAL system airflow and extracted product. In one embodiment, VAL systems can be used to improve the dissolved gas extraction yield of an air lift. In general, various embodiments can relate to a method for treating an aqueous effluent comprising at least one dissolved gaseous compound, for example carbon dioxide, and at least partially separating the compound from the effluent in order to obtain a treated aqueous phase. The depleted aqueous phase may be depleted of the undesirable compound.

Embodiments of a VAL system in accordance with versions described herein can include establishing an upflow liquid column of an aqueous effluent. A gas phase, less rich in an undesirable compound in the aqueous effluent, for example air or oxygen, can be injected or distributed into the bottom of the column. The gas phase can be distributed in the column in the form of bubbles where the volume of the bubbles increases with upward movement such that a mixed liquid/gas stream is obtained at or at about the top of the column. The mixed liquid/gas stream can be separated into a liquid stream constituting the treated aqueous phase and an offgas stream enriched with the undesirable gaseous compound. The VAL system can be characterized in that the mixed liquid/gas stream can be separated under vacuum by establishing a gas headspace between the liquid stream and the gas stream and by aspirating the gas stream.

Embodiments of the VAL systems can function like a siphon, where a liquid stream that has been separated from an offgas stream can constitute a downflow liquid column. The downflow liquid column can be obtained by overflow of the mixed liquid/gas stream above a high point of the inner tube. In such embodiments, the downflow liquid column can be associated with a photobioreactor for further treatment of the stream.

The examples discussed herein are examples only and are provided to assist in the explanation of the apparatuses, devices, systems, and methods described herein. None of the features or components shown in the drawings or discussed below should be taken as mandatory for any specific implementation of any of these apparatuses, devices, systems, or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Example embodiments described herein can improve the functionality of existing VAL systems as a retrofit, or the like. For example, VAL systems may have limited control and/or usefulness in particular applications that may be improved by embodiments or features associated with the embodiments described herein.

A VAL computer system can be used to control the VAL systems described herein. The VAL system can be monitored, controlled, accessed, or the like via any suitable technique, such as via a web-browser such as SAFARI, OPERA, GOOGLE CHROME, INTERNET EXPLORER, or the like executing on a client device. In some embodiments, the systems and methods described herein can be a web-based application or a stand-alone executable. Additionally, in some embodiments, the systems and methods described herein can integrate with various types of water management systems, such as waste management, nutrient sources, photobioreactors, and the like. Any suitable client device can be used to access, or execute, the VAL computing system, such as laptop computers, desktop computers, smart phones, tablet computers, and the like.

Systems and methods described herein may generally provide a constant source of treated water for the growth of organisms. Interaction with the VAL systems and any associated computer system may include, without limitation, keyboard entry, writing from pen, stylus, finger, or the like, with a computer mouse, or other forms of input (voice recognition, etc.). The VAL system interface may be presented on a tablet, desktop, phone, board, or paper. The VAL computer system can be a personal computer, or one or multiple computers in a server-type system, for example.

In one embodiment, VAL systems can be used to improve the dissolved gas extraction yield of an air lift. In general, various embodiments relate to a method for treating an aqueous effluent comprising at least one dissolved gaseous compound, for example carbon dioxide, and at least partially separating the compound from the effluent in order to obtain a treated aqueous phase. The depleted aqueous phase may be depleted of the undesirable compound.

Embodiments described herein may provide an improved method of treatment, degasification, or degassing of a recirculated aqueous medium for culturing a living organism. Generally, such systems can include a bath of the aqueous medium in which the living organism is cultivated and an effluent stream, from which the aqueous effluent is obtained, can be tapped off from the bath. The bath can be supplied with a feed stream, obtained from a treated aqueous phase, where the treated aqueous phase can be obtained outside the bath of aqueous medium by degassing the aqueous effluent under vacuum. With regard to the separation of the mixed liquid/gas stream, "vacuum" can mean any pressure lower than the value obtained by subtracting, for example in cm water, the height of the upflow liquid column from the atmospheric pressure, or hydraulic pressure of the aqueous effluent to be treated.

Referring now to FIG. 1, one embodiment of an aquaculture facility 40 can be organized around a bath 13 of aqueous medium, in which the living organism of interest, for example fish, can be cultured or bred. An effluent stream 15 can be tapped off from the bath 13, mechanically filtered 27, and sent to a buffer tank 28. A recirculation loop 29 can be established from the buffer tank 28, for converting the nitrogen effluent, particularly ammonia, by the enzymatic or bacterial method, to nitrite and nitrate. For this purpose, a stream can be withdrawn from the buffer tank 28, optionally supplemented 33 with fresh water, heated in a heat exchanger 30, sterilized 31 by UV radiation, then filtered using a bacterial bed 32, and finally returned to the buffer tank 28. The aqueous effluent 16 to be treated can be obtained from the buffer tank 28.

A treatment installation 1 can include extracting or removing the dissolved gases in a gas stream 19, including carbon dioxide, nitrogen, or the like. The treatment installation 1 can receive the aqueous effluent 16 and can generate a treated solution that is degassed from which a feed stream 17 can be reintroduced into the bath 13. As the aqueous medium passes through the treatment installation 1 it can be depleted of dissolved gases that can be removed with the gas stream 19 by the elution or "stripping" action in accordance with embodiments described herein. This can be achieved by injection of a gas phase 10, which can be air, and which can be poorer in carbon dioxide and/or nitrogen than the aqueous effluent 16. Part of the aqueous effluent 16 introduced into the treatment installation 1 may be obtained directly from the bath 13. The bath 13 can receive nutrients 34 for the growth and development of the cultured living organisms and a purge of nitrates 35 can be regularly carried out.

Figure 2:
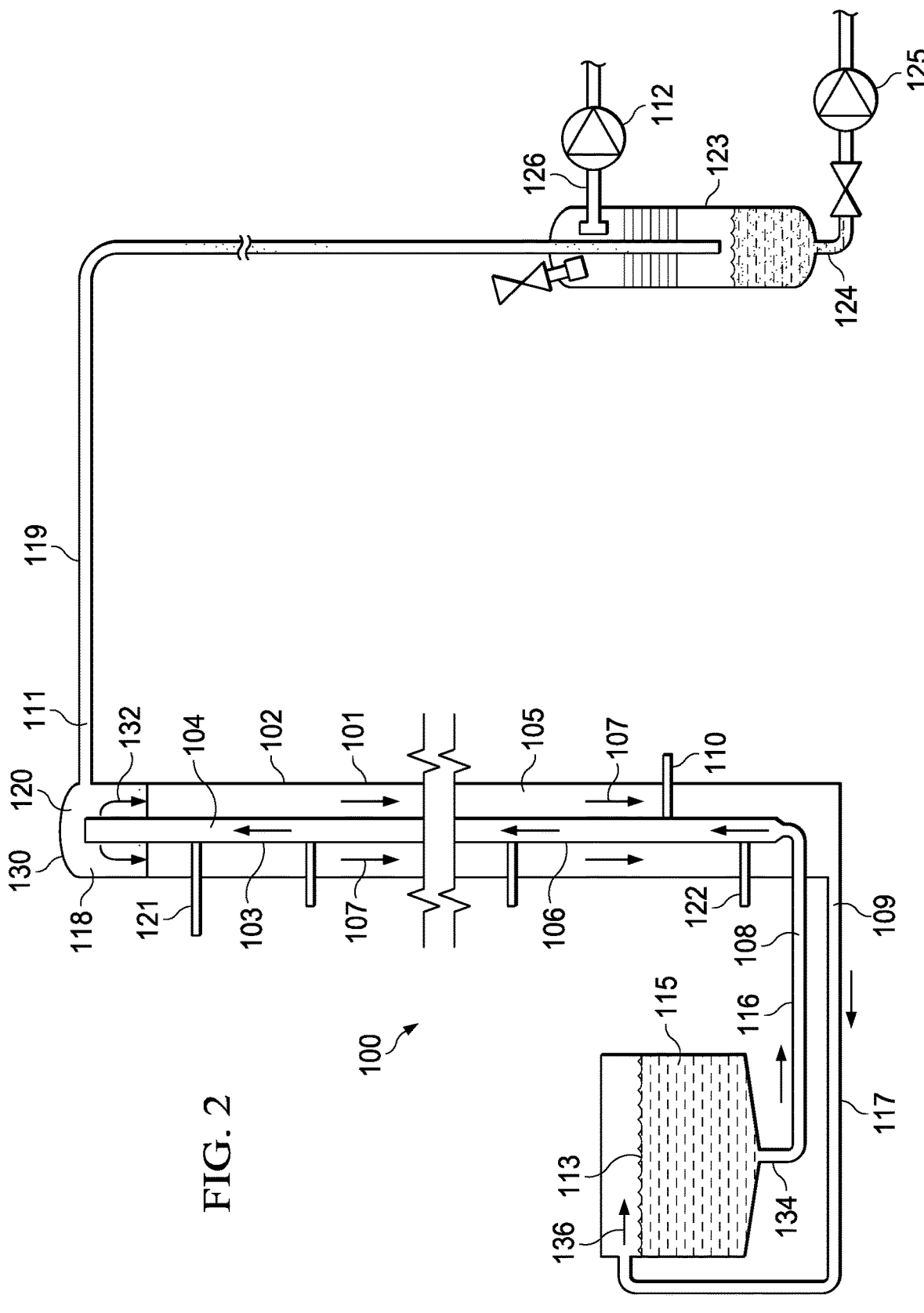
FIG. 2 is a schematic illustration of an installation for treating an aqueous effluent according to one embodiment.

Referring to FIG. 2, one embodiment of an installation 100 for aqueous effluent treatment is shown. The installation 100 can be used in conjunction with an aquaculture bath 113. The installation 100 can include a vacuum column 101 that can include two concentric tubes, an external tube 102 and an internal tube 103, where the external tube 102 and internal tube 103 can be coaxial and can have a vertical orientation. The internal tube 103 can define an internal chamber 104, which may be tubular, for an upflow liquid column 106 and the external tube 102 can define an external chamber 105, which can be tubular, for a downflow liquid column 107. A top of the external tube 102 can be closed with a cap 130, where the cap 130 can be above the open upper end 132 of the internal tube 103, such that the external chamber 105 can be substantially closed and isolated from the atmosphere.

The installation 100 can include an inlet 108 for introducing the aqueous effluent 116 to be treated, which can be positioned at a bottom of the internal chamber 104. The installation 100 can include an outlet 109 for removing the treated aqueous phase at the bottom of the external chamber 105. An inlet 110 can be operably configured for injecting and distributing a gas phase, such as pressurized air, into the upflow liquid column 106, where the inlet 110 can be connected to a source of pressurized gas phase (not shown). An outlet 111 for removing an offgas stream can be provided, where the offgas stream can be enriched with gaseous compound previously dissolved in the aqueous effluent. The offgas stream can be connected to an aspiration system 112 that can include an air pump (not shown). This installation 100 can facilitate the treatment of the aqueous effluent 116 by removing undesirable dissolved gaseous compound(s), such as carbon dioxide, by separating the compounds at least partially from the effluent. Once the compounds are at least partially, substantially, or wholly removed the aqueous solution can be returned to the aquaculture bath 113.

During operation, still with reference to FIG. 2, the upflow liquid column 106 of aqueous effluent 116 can be established in the internal chamber 104. The gas phase can be injected through the inlet 110 into the internal chamber 104, at about the bottom of the internal chamber 104 for example, where the gas phase delivered through the inlet 110 can be poorer in an undesirable compound than the aqueous effluent 116. For example, the inlet 110 can deliver a gas phase including pressurized air or oxygen, where the gas phase can be distributed in the internal chamber 104 in the form of bubbles (not shown) such that the volume of the bubbles increases as they move upwardly. In this manner a substantially homogeneous mixed liquid/gas stream 118 can be obtained at about the top of the installation 100. The homogeneous mixed liquid/gas stream 118 can be separated into a liquid stream 117, constituting the downflow liquid column 107 in the external chamber 105, which can be obtained by overflow of fluid above the open upper end 132 of the internal tube 103. The mixed liquid/gas stream can also be separated into an offgas stream 119, which can be enriched with the undesirable gaseous compound from the aqueous effluent 116 for removal.

In one embodiment of the installation 100, in the upper part of the external chamber 105, a gas headspace 120 can be established between the liquid stream 117 and the offgas stream 119, corresponding to the separation of the homogeneous mixed liquid/gas stream 118. The gas headspace 120 can be under vacuum because of the aspiration of the offgas stream 119 by the aspiration system 112, in one embodiment. In this manner, the vacuum column can operate like a siphon, as shown in FIG. 2, where the downflow liquid column 107 and the upflow liquid column 106 can be concentric, the upflow liquid column 106 being internal, and the downflow liquid column 107 being external. It will be appreciated that the relationship and function of the downflow and upflow columns can be reversed.

The installation 100 can include the following features, which can be considered separately or in combination with one another. The processing cycle can include introducing aqueous effluent 116 at the bottom of the upflow liquid column 106 and tapping the treated aqueous phase at the bottom of the downflow liquid column 107. In addition to injected air, oxygen 121 can be injected and distributed in the upflow liquid column 106. The oxygen 121 can be provided in an upper half of the upflow liquid column 106, in an upper third of the upflow liquid column 106, above the inlet 110, or at any other suitable position. The oxygen 121 injection can serve, if desirable, to complete the oxygenation of the aquaculture aqueous medium. Ozone 122 can be injected if desirable, for example, to sterilize the aqueous medium, decompose humic acids, and restore the redox potential of the aqueous medium. Ozone 122 can be injected and distributed in the downflow liquid column 107. The ozone 122 can be introduced at a lower level than the inlet 110, in a bottom third of the downflow liquid column 107, and/or in a bottom half of the downflow liquid column 107. In one embodiment, the cross-section or width of the downflow liquid column 107 can increase from an upper end to a lower end.

The offgas stream 119 can be in the form of foam, where a foam removal system 123 can be provided, to obtain a liquid exudate 124. The liquid exudate 124 can include a particulate fraction, for example, of organic matter in suspension or in colloidal form, and an offgas 126 free of liquid phase and solid particles can be separated. The liquid exudate 124 can be removed by a pump 125. The offgas 126 can be pumped by the aspiration system 112, where suction can be facilitated in the gas headspace 120 of the external chamber 105 to create a vacuum.

As shown in FIG. 2, the effluent stream 115, from which the aqueous effluent 116 to be treated is obtained, can be tapped off from the aquaculture bath 113. The aquaculture bath 113 can be supplied with a liquid stream 117, or feed stream, obtained from, or identical to the treated aqueous phase, the latter being obtained outside the aquaculture bath 113 from the aqueous effluent 116, according to the treatment method carried out in accordance with versions described herein. The level of withdrawal 134 from the aquaculture bath 113 can be substantially the same as that of the bottom of the upflow liquid column 106. The feed level 136 of the aquaculture bath 113 can be above the bottom of the downflow liquid column 107.

Figure 3:
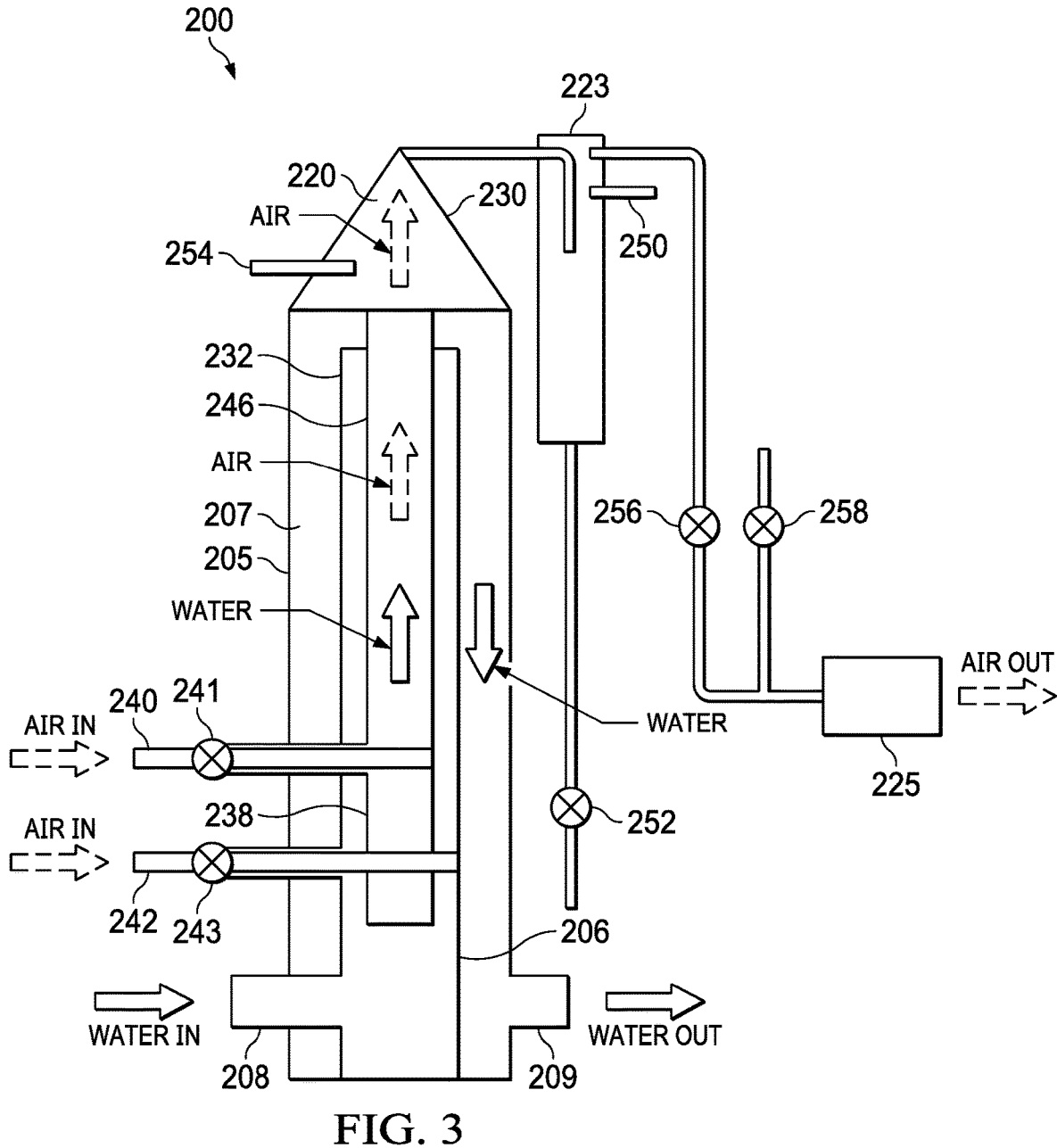
FIG. 3 is a schematic illustration of a vacuum air lift system having an independent circulation and particle extraction system according to one embodiment.

Referring to FIG. 3, an alternate version of an installation 200 is shown. Example embodiments in accordance with installation 200 can provide the capability to independently control water circulation rate and particle extraction rate for a VAL system. It may be advantageous to provide a VAL system, such as installation 200, that can be optimized independently for water circulation rate and particle extraction rate. The highest particle extraction efficiency generally occurs at low water circulation rates while the lowest extraction efficiency generally occurs at a high-water circulation rate. It may be advantageous to provide a system where one factor is not compromised to improve on the other factor.

An installation 200 of a vacuum air lift tower (VALT), such as shown in FIG. 3, can be a plastic or fiberglass structure from about 12 feet to about 16 feet tall, for example. It will be appreciated that any height of the installation 200 is contemplated such as from about 10 feet to about 20 feet tall, from about 5 feet to about 25 feet tall, or any suitable height. In the illustrated embodiment, the installation 200 can include a fluid upflow tube 206, a fluid downflow tube 207, and an inner tube 238, where the fluid upflow tube 206, fluid downflow tube 207, and inner tube 238 can be concentric and can include a cap 230 at a top of the installation 200. The installation 200 can include a water inlet 208 at the bottom of the fluid upflow tube 206 and a water outlet 209 at a bottom of the fluid downflow tube 207. Air (or other gases) can be fed to the inner tube 238 via a micro-bubble airlift 240. The air can be controlled with a valve 241. Air (or other gases) can be fed to the fluid upflow tube 206 via a macro-bubble airlift 242. The air can be controlled with a valve 243. A vacuum pump 225 can be connected to an evacuation tank 223 or holding tank. The evacuation tank 223 can be connected to the cap 230 at the top of the installation 200. Level sensors can be used to control water levels. Additional valves can be used to manage system airflow and extracted product.

As shown, the installation 200, can include a concentric fluid upflow tube 206 and a fluid downflow tube 207. The fluid upflow tube 206 can draw water, or other fluid, from a source tank (e.g., aquaculture bath 113 of FIG. 2) and up the fluid upflow tube 206. The water can then be returned to the source tank by flowing down an external chamber 205 defined between the fluid upflow tube 206 and fluid downflow tube 207. The vacuum pump 225 can be connected to a chamber 220 at the top of the installation 200 to draw the water up the fluid upflow tube 206, aided by a macro-bubble airlift 242 and/or micro-bubble airlift 240 that can be associated with the fluid upflow tube 206. The rising air bubbles from aerators such as the macro-bubble airlift 242 and/or micro-bubble airlift 240 can provide hydraulic lift that can facilitate carbon dioxide/oxygen exchange. In addition, the bubbles can cause a foaming action in the water that can collect micro-particulates or pathogens that can be carried to the top of the installation 200, such as into the chamber 220, where they can be transferred to the evacuation tank 223 by a vacuum created with the vacuum pump 225.

Still referring to FIG. 3, the inner tube 238 can be incorporated into the installation 200 to allow independent control of particle extraction flowrate via the micro-bubble airlift 240 and circulation flowrate via the macro-bubble airlift 242. Water can be drawn up the inner tube 238 by the micro-bubble airlift 240 where particulates can be captured by the micro-bubbles and extracted by the vacuum into the evacuation tank 223. Water can be drawn up the fluid upflow tube 206 by the macro-bubble airlift 242. At the top of 232 of the fluid upflow tube 206, water can overflow into the external chamber 205 and return to the source tank (e.g., aquaculture bath 113). The micro-bubble airlift 240 and the macro-bubble airlift 242 can be controlled independently, such as by the respective valve 241 and valve 243, allowing the micro-bubble airlift 240 and the macro-bubble airlift 242 to be optimized for the application requirements.

The inner tube 238 can be extended above the fluid upflow tube 206 to maintain some separation of the particle extraction and circulation flow streams. By separating the top of the inner tube 238 and the fluid upflow tube 206, the tendency to re-entrain particles in the circulation stream by co-mingling may be reduced. The inner tube can extend any suitable distance above the top 232 of the fluid upflow tube 206, such as from about 6 inches to about 12 inches, from about 8 inches to about 16 inches, from about 3 inches to about 10 inches, from about 1 inch to about 12 inches. Liquid from a particle extraction stream 246 can still be allowed to spill over the inner tube 238 and into a circulation stream of the fluid upflow tube 206. Particle extraction foam and stripped gases from the circulation stream can still rise and be extracted into the evacuation tank 223 by the vacuum, in one embodiment. Aerators, such as the macro-bubble airlift 242 and/or micro-bubble airlift 240, can be located vertically in the inner tube 238 and/or fluid upflow tube 206, for example, as needed to optimize circulation and particle extraction efficiency.

It will be appreciated that the installation 200 can include any suitable features, sensors, valves, pumps, tanks, or the like as desirable. For example, it may be beneficial to include a first level sensor 250 associated with the evacuation tank 223. The first level sensor 250 can be associated with a tank drain valve 252, where the evacuation tank 223 can be drained when a threshold level of fluid and/or waste has accumulated. The installation 200 can include a second level sensor 254 that can be associated with the chamber 220 defined by the cap 230. The second level sensor 254 can monitor the fluid levels to ensure that the installation 200 is operating properly. The installation 200 can include a vacuum pump/holding tank isolation valve 256 as well as a vacuum release valve 258.

Figure 4:
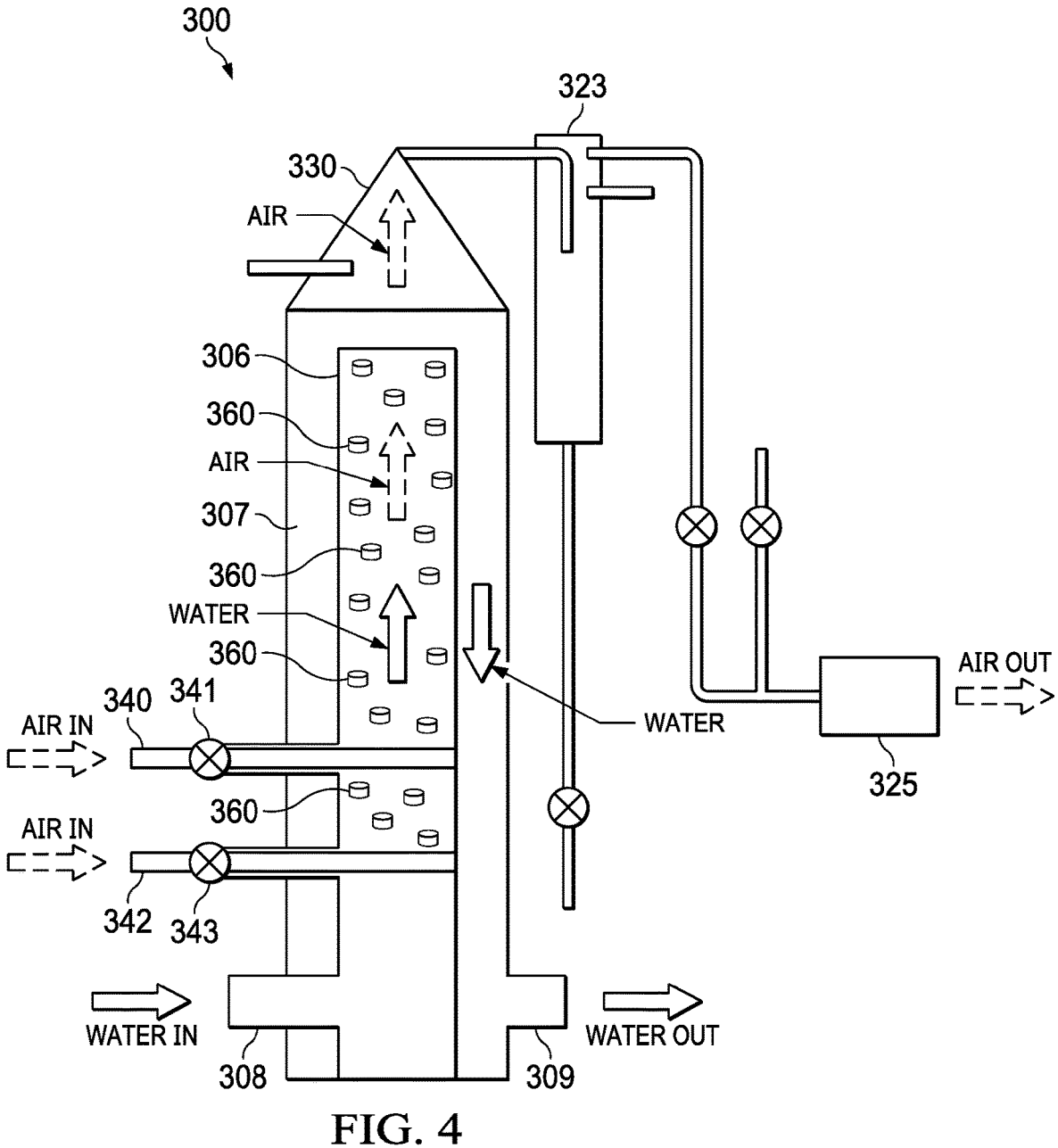
FIG. 4 is a schematic illustration of a vacuum air lift system having a plurality of biological film elements according to one embodiment.

Independently controlled aerators can be incorporated into the installation 200 to provide micro and macro-bubble aeration in both the inner tube 238 and the fluid upflow tube 206, which can allow for a greater range of functionality. Embodiments can provide optimization of water circulation and particle extraction functions for greater energy efficiency. Independent control of water circulation and particle extraction may improve overall VAL system performance. Independent control of water circulation can eliminate other water circulation tools, such as paddlewheels, which can improve system efficiency and reduce capital investment and operating costs. Independent control of particle extraction can allow compensation for times of increased particle density such as, for example, after feeding in aquaculture or during harvest in alga-culture applications Referring to FIG. 4, an alternate embodiment of an installation 300 for a multi-function water treatment device is shown. Embodiments of the installation 300 can provide water circulation, dissolved gas extraction, aeration, de-nitrification, Biochemical Oxygen Demand (BOD) and Chemical Oxygen Demand (COD) reduction, particulate extraction and microbe extraction, and combinations thereof. Incorporating features of the installation 300 into a VAL system can provide de-nitrification and complete oxygen demand reduction. Incorporating a biological filter such as a Moving Bed Biofilm Reactor (MBBR) in the VAL can also provide a substantially complete multi-function capability.

The installation 300 can include a fluid upflow tube 306, a fluid downflow tube 307, and a cap 330. Embodiments can include a water inlet 308 at or near a bottom of the fluid upflow tube 306 and a water outlet 309 at or near the bottom of the fluid downflow tube 307. Air (or other gases) can be fed to the fluid upflow tube 306 via a first aerator 340 associated with a first control valve 341 and a second aerator 342 associated with a second control valve 343. The first control valve 341 and the second control valve 343 can be used to control the airflow through the first aerator 340 and the second aerator 342, respectively. A vacuum pump 325 can be connected to a holding tank 323. The holding tank 323 can be connected to the cap 330 at the top of the fluid upflow tube 306 and the fluid downflow tube 307. Any suitable level sensors can be used to control water levels. Valves can be used to manage system airflow and extracted product.

MBBR elements 360 or other biological filters can be contained within the fluid upflow tube 306. The MBBR elements 360 can each have an extended projected surface having a biofilm, for example. Examples of configurations can include batch harvest and continuous operational modes. It will be appreciated that any suitable configuration, biofilm, and the like is contemplated.

Figure 5:
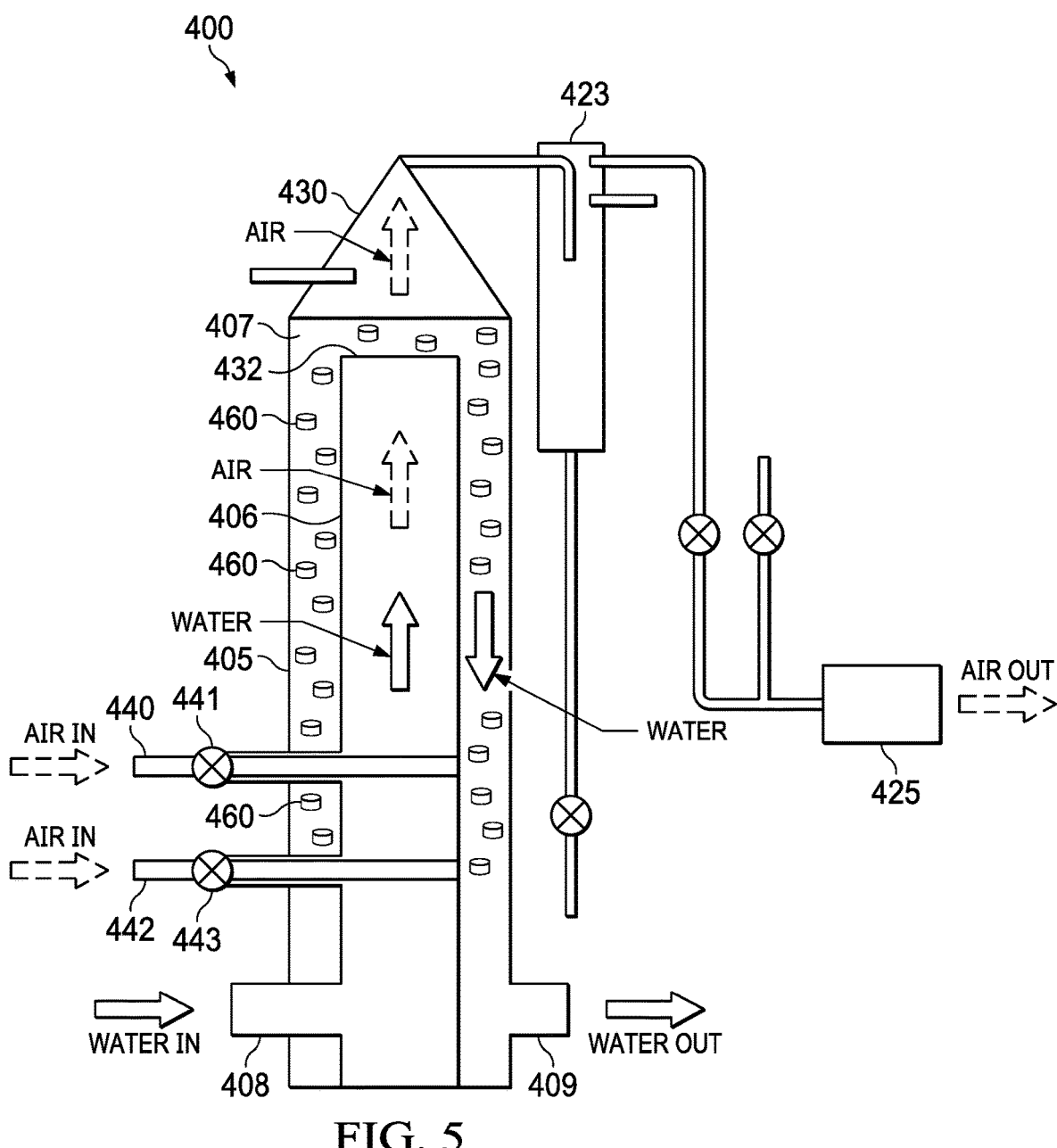
FIG. 5 is an alternate embodiment of the vacuum air lift system shown in FIG. 4.

Referring to FIG. 5, an alternate embodiment of an installation 400 for a multi-function water treatment device is shown. Embodiments of the installation 400 can provide water circulation, dissolved gas extraction, aeration, de-nitrification, Biochemical Oxygen Demand (BOD) and Chemical Oxygen Demand (COD) reduction, particulate extraction and microbe extraction, and combinations thereof. Incorporating features of the installation 400 into a VAL system can provide de-nitrification and complete oxygen demand reduction. Incorporating a biological filter such as a Moving Bed Biofilm Reactor (MBBR) in the VAL can also provide a substantially complete multi-function capability.

The installation 400 can include a fluid upflow tube 406, a fluid downflow tube 407, and a cap 430. Embodiments can include a water inlet 408 at or near a bottom of the fluid upflow tube 406 and a water outlet 409 at or near the bottom of the fluid downflow tube 407. Air (or other gases) can be fed to the fluid upflow tube 406 via a first aerator 440 associated with a first control valve 441 and a second aerator 442 associated with a second control valve 443. The first control valve 441 and the second control valve 443 can be used to control the airflow through the first aerator 440 and the second aerator 442. A vacuum pump 325 can be connected to a holding tank 423. The holding tank 423 can be connected to the cap 430 at the top of the fluid upflow tube 406 and the fluid downflow tube 407. Any suitable level sensors can be used to control water levels. Valves can be used to manage system airflow and extracted product.

MBBR elements 460, where the MBBR elements 460 can be marginally buoyant, can be contained in the fluid downflow tube 407. The buoyancy of the MBBR elements 460 can resist the downward flow of the water pouring out the top 432 of the fluid upflow tube 406, which can suspend the MBBR elements 460 in the fluid flow within the external chamber 405. In certain embodiments, biological filters (such as MBBR elements 360) can be contained in the fluid upflow tube 406. For example, the first aerator 440 and second aerator 442 combined with rising water flow can suspend the MBBR elements (e.g., MBBR elements 360) in the fluid upflow tube 406. It will be appreciated that installation 300 and installation 400 can be combined such that MBBR elements can be contained in both the fluid upflow tube 406 and the fluid downflow tube 407 to maximize bio-filter capacity.

The MBBR elements 460 can include a biofilm (bacteria, for example) that can provide a high-rate biodegradation of waste products resulting in de-nitrification, Biochemical Oxygen Demand (BOD) reduction and Chemical Oxygen Demand (COD) reduction. VAL systems incorporating the installation 300 and/or the installation 400 can have an integrated biological filter such that the installations can provide water circulation, dissolved gas extraction, aeration, de-nitrification, Biochemical Oxygen Demand (BOD) reduction, Chemical Oxygen Demand (COD) reduction, particulate extraction, and microbe extraction.

Incorporation of MBBR elements (e.g., MBBR elements 360, 460) can provide the aeration (oxygen) needed for desirable biological reaction. This high-density population of bacteria can provide a high-rate biodegradation of wastes within the associated VAL system. Aerators (e.g., first and second aerators 440, 442) can provide the oxygen needed for the biological reaction and agitation of the MBBR elements to ensure effective mixing and distribution of the influent waste, oxygen, and biofilm media. Additional aerators can be incorporated to compensate for the biochemical or chemical oxygen demand. More MBBR elements can be utilized in a VAL for a given footprint due to the water column created by the vacuum which can be an improvement over existing system. The MBBR elements (e.g., MBBR elements 360, 460) can increase the dwell time and mixing of injected air which can improve gas exchange. Air lift pumps may be more efficient than traditional pumps in low head applications. Use of a vacuum (negative pressure) can require less energy than compressed airflow and may make embodiments described herein advantageous.

Biological filter elements can be incorporated in the fluid upflow tube 406 and/or fluid downflow tube 407. Water circulation through the MBBR filter can be accomplished with the low power input of a VAL system, in one embodiment. Foam fractionation from micro-bubble aeration and vacuum extraction of the foam can remove sloughed off MBBR element byproducts. Flow cross section (diameter) of any suitable component, such as the fluid upflow tube 406 and/or fluid downflow tube 407, can be increased to compensate for reduction in flow area caused by filter elements. The flow drag created by the MBBR elements (e.g., MBBR elements 360, 460) can be compensated for by increasing the diameter of the fluid upflow tube 406, the fluid downflow tube 407, and/or any other associated tubes, chambers, or the like that may be utilized. Additional aerators can be incorporated to satisfy increased oxygen demand.

In one embodiment, two or more systems or installations can be connected in series or parallel, where each of the systems can be identically configured, differently configured, or designed for a specific objective. Alternatively, a single VAL system, such as the installations described herein, can be vertically partitioned, for example, to optimize for specific functions. The number of filter elements can be increased or decreased to match a wide range of biological loads. Placement and quantity of MBBR elements (e.g., MBBR elements 360, 460) can be tailored to individual applications to allow for process optimization. It will be appreciated that other biological filters can be utilized instead of MBBR elements.

Numerous advantages can be associated with a system incorporating one or a plurality of MBBR elements as illustrated with respect to installation 300 and installation 400. Incorporation of MBBR elements (e.g., MBBR elements 360, 460) in a VAL system can provide the aeration (e.g., using the first and second aerators 440, 442) that may be needed for certain biological reactions. More MBBR elements can be utilized in a VAL system for a given footprint due to the large vertical water column created by the vacuum. Such systems can provide more complete aquaculture and sewage or waste water treatment solutions at lower power input and lower investment and operating costs. Embodiments described herein can provide multi-function capability in a single assembly, system, installation, or the like. Embodiments can simplify the system construction and operation, which can decrease acquisition and operational costs. Embodiments can provide low energy mechanisms to aerate, remove carbon dioxide, circulate water, agitate biological elements, and remove wastes. Embodiments can be sustainable and environmentally friendly as a result of low energy input, water re-use, and elimination of the need for chemical additives. Extracted biomass, including particulates, removed from the circulating stream, and sloughed off MBBR product can be utilized in biofuel applications or as a nutrient in agriculture applications.

Figure 6:
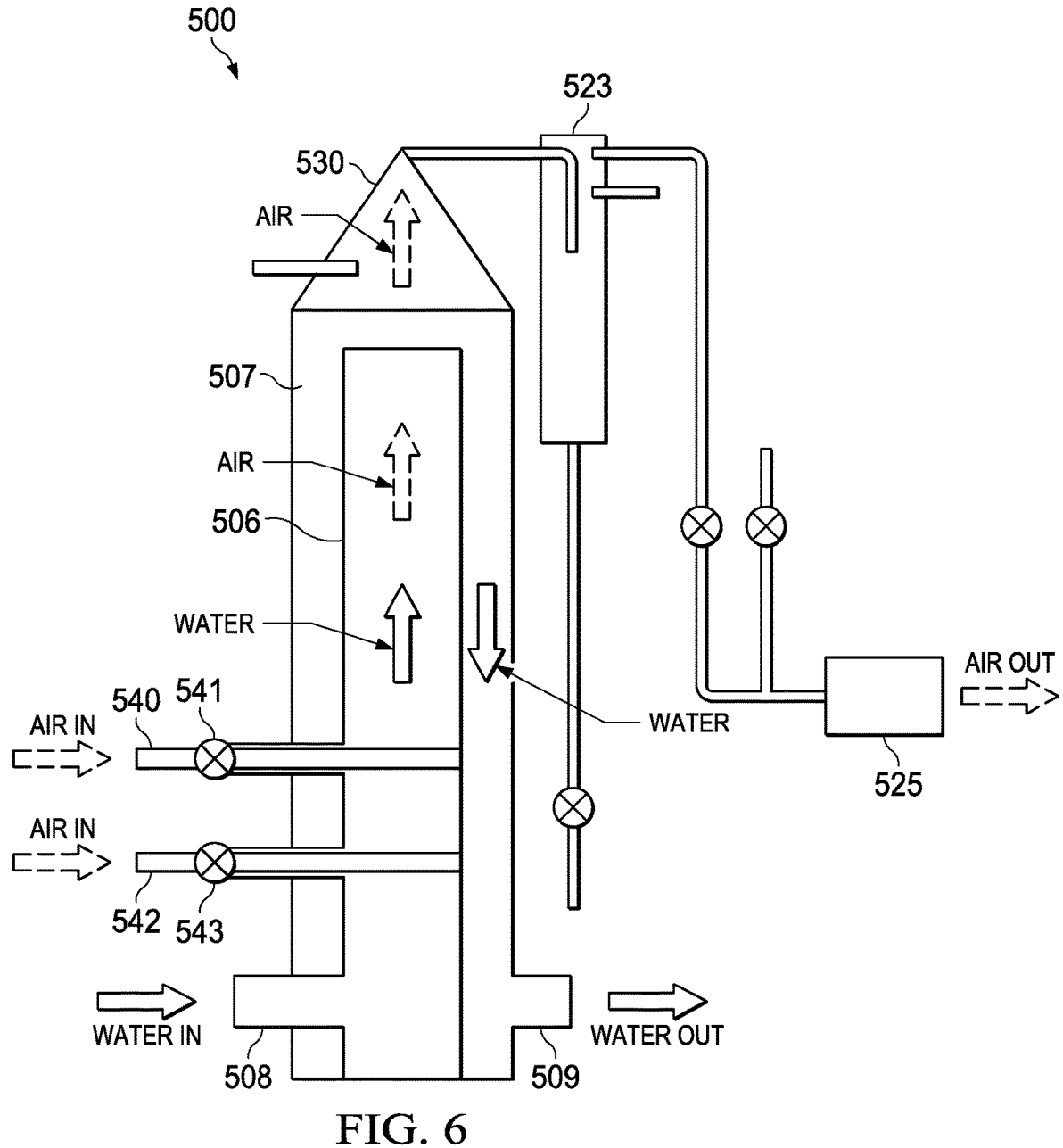
FIG. 6 is a schematic illustration of a vacuum air lift system having a fluidic oscillator according to one embodiment.
Figures 7A, 7B:
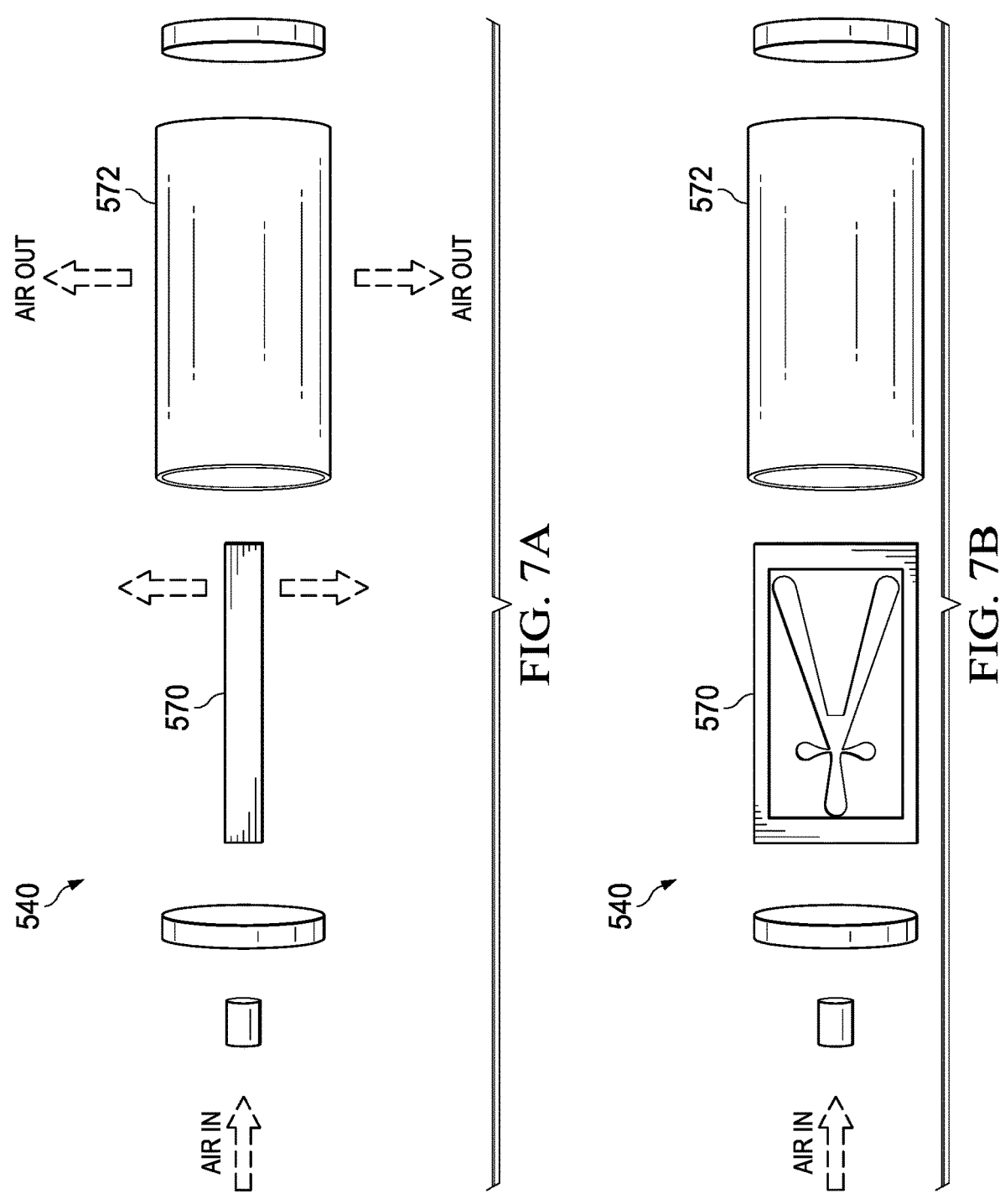
FIG. 7A is a top view of an aerator associated with the vacuum air lift system of FIG. 6 according to one embodiment.
FIG. 7B is a partial cross-sectional view of the aerator shown in FIG. 7A.

Referring to FIG. 6, embodiments of an installation 500 can facilitate particle extraction and gas exchange in a VAL system by incorporating a fluidic oscillator 570 in a micro-bubble diffuser 572 (see FIGS. 7A and 7B). The micro-bubble diffuser 572 can be a porous polyethylene micro-bubble diffuser. It may be advantageous to produce micro-bubbles for gas exchange and particle extraction in freshwater applications. This is due to the higher bubble detachment force that may be required in freshwater applications versus seawater applications. Such systems may be useful in freshwater sources as gas exchange and particulate extraction are generally inversely proportional to micro-bubble size.

The installation 500 can include a plastic or fiberglass structure approximately 12 to 16 feet tall. The installation 500 can include a fluid upflow tube 506, a fluid downflow tube 507, and a cap 530. Embodiments can include a water inlet 508 at or near a bottom of the fluid upflow tube 506 and a water outlet 509 at or near the bottom of the fluid downflow tube 507. Air (or other gases) can be fed to the fluid upflow tube 506 via a first aerator 540 associated with a first control valve 541 and a second aerator 542 associated with a second control valve 543. The first control valve 541 and the second control valve 543 can be used to control the airflow through the first aerator 540 and the second aerator 542. A vacuum pump 525 can be connected to a holding tank 523. The holding tank 523 can be connected to the cap 530 at the top of the fluid upflow tube 506 and the fluid downflow tube 507. Any suitable level sensors can be used to control water levels. Valves can be used to manage system airflow and extracted product.

In example embodiments, the first aerator 540 can have a fluidic oscillator 570 or bi-stable valve that alternates flow pulses to separate chambers of a porous polyethylene diffuser. The vacuum pump 525 that can be connected to the chamber 520 at the top of the installation 500 can draw the water up the fluid upflow tube 506 by a second aerator 542

(e.g., a macro-bubble aerator) and/or a first aerator 540 (e.g., a micro-bubble aerator) at or near the bottom of the fluid upflow tube 506. In the same general manner as an aquarium pump, the rising air bubbles can provide hydraulic lift and can cause carbon dioxide and/or oxygen exchange. In addition, the bubbles can cause a foaming action that can collect micro-particulates or pathogens and can carry them to the top of the installation 500 (e.g., the chamber 520), where they can be transferred to the holding tank 523 by the vacuum created by the vacuum pump 525.

In one embodiment, referring to FIGS. 7A and 7B, the first aerator 540 can have a fluidic oscillator 570 or bi-stable valve that can alternate flow pulses to separate chambers of the micro-bubble diffuser 572 such as in a porous polyethylene diffuser. Air can be drawn into the first aerator 540 by the vacuum pump 525 or any other suitable pump. The air can enter the fluidic oscillator 570, where alternating pulses of air can be discharged into separate chambers of the first aerator 540. The pulsed air can pass through the micro-bubble diffuser 572 creating and releasing micro-bubbles, where the micro-bubbles can travel through the fluid upflow tube 506, for example. The micro-bubbles can cause gas exchange with the water and can also collect particles. The degree of gas exchange and particle extraction can be inversely proportional to the micro-bubble size. The fluidic oscillator 570 or bi-stable valve can produce micro-bubbles approximately an order of magnitude smaller using the same micro-bubble diffuser 572.

It will be appreciated that the first aerator 540 is shown by way of example only, where different diffuser styles or materials could be utilized. Pressurized air can be supplied to the first aerator 540 to increase air flow rate. As described, it may be advantageous to provide the incorporation of a fluidic oscillator for micro-bubble generation in a VAL system, where micro-bubble generation may improve gas exchange, micro-particle extraction, and/or microbe extraction in such a system. This increased effectiveness may reduce energy consumption, broaden the range of applications of a VAL system, and eliminate or diminish chemical usage in freshwater applications.

Embodiments can include the use of any suitable diffuser such as a porous polyethylene diffuser in conjunction with a fluidic oscillator. Embodiments can incorporate a porous cylindrical diffuser and fluidic oscillator to create a continuous flow bi-stable valve micro-bubble generator. Using a fluidic oscillator to partition a cylindrical diffuser into two semi-circular cross section chambers can allow a continuous flow and may eliminate parasitic losses associated with flow management for separate diffusers. Such a configuration can help maximize the efficiency of the micro bubble generation and the effectiveness of the VAL in gas exchange and particle extraction.

Use of a vacuum and/or negative pressure can be used to generate flow through a fluidic oscillator using any suitable features or components. Incorporation of a fluidic oscillator can greatly decrease micro-bubble size, which can improve gas exchange and particle extraction due to the significant increase in surface area relative to the total volume of air compared to larger bubbles (area is proportional to radius squared, Volume is proportional to radius cubed). The fluidic oscillator or bi-stable valve can produce micro-bubbles approximately an order of magnitude smaller using the same diffuser. Embodiments of the fluidic oscillator may have no moving parts which can make it inherently reliable. The fluidic oscillator may reduce energy consumption by, for example, 18% compared to traditional continuous flow diffusers. Embodiments described herein may be sustainable and environmentally friendly as a result of low energy input, water re-use, and no chemical additives in some embodiments. Use of a porous polyethylene diffuser in conjunction with a fluidic oscillator may be beneficial. The porous polyethylene diffuser can provide a low-pressure differential media for generation of the microbubbles. Use of a porous cylindrical diffuser and fluidic oscillator to create a continuous flow bi-stable valve micro-bubble generator may be beneficial. Using a fluidic oscillator to partition a cylindrical diffuser into two semi-circular cross section chambers can allow a continuous flow and can eliminates parasitic losses associated with flow management for separate diffusers, which in turn can maximize the efficiency of the micro bubble generation and the effectiveness of the VAL system in gas exchange and particle extraction. Use of a vacuum and/or negative pressure to generate flow through a fluidic oscillator can improve fluidic oscillator stability.

Figure 8:
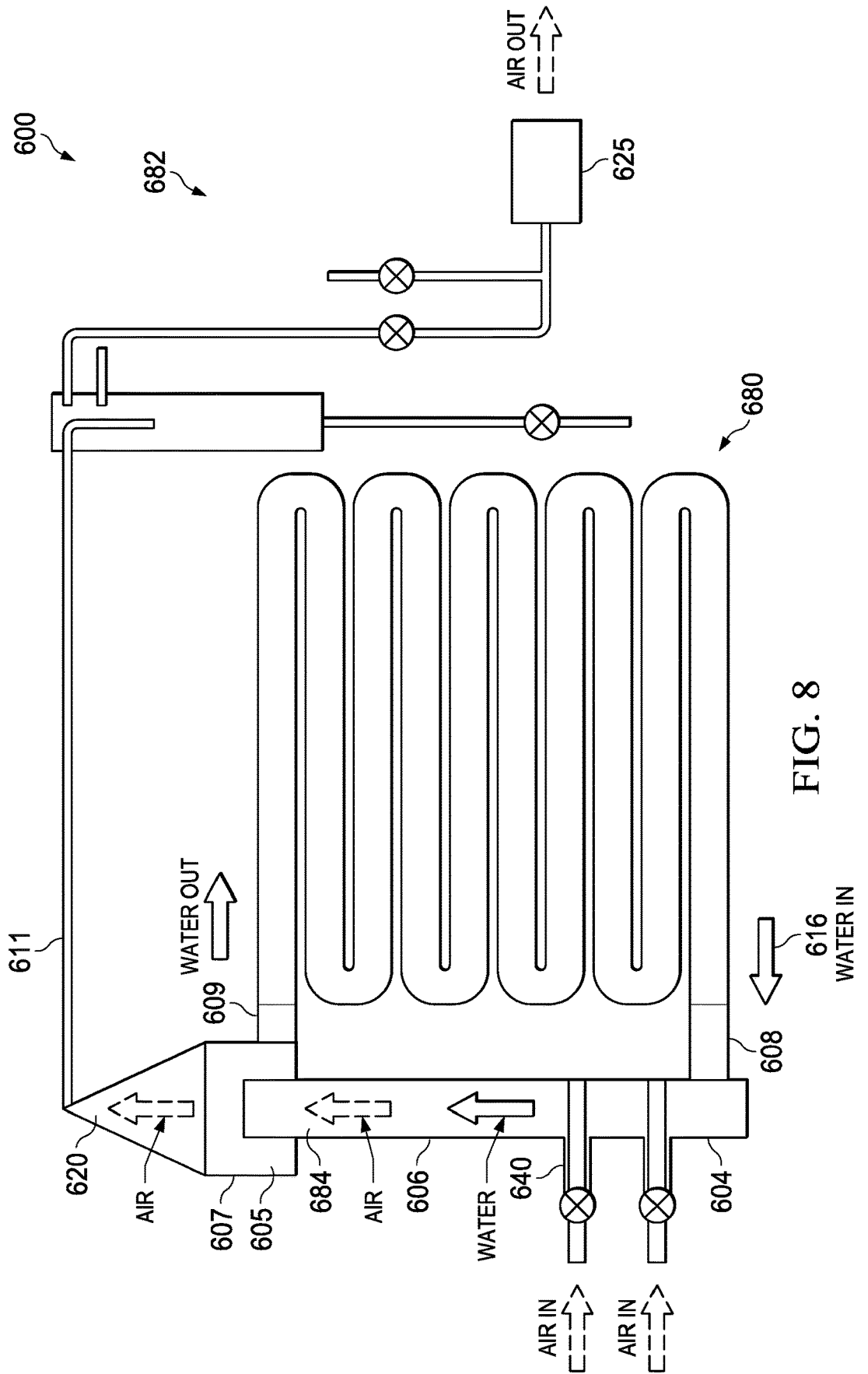
FIG. 8 is a schematic illustration of an installation associated with a photobioreactor for treating an aqueous effluent according to one embodiment.

Referring to FIG. 8, one embodiment of an installation 600 is shown, where the installation 600 can be an aqueous effluent treatment and photobioreactor installation. Any photobioreactor, fluidized bed reactor, or the like, is contemplated. The installation 600 can be used in conjunction with an aquaculture bath, alga-culture raceway, or pond, for example, or with any other fluid or fluid retainer. The installation 600 can include a vacuum column that can include two vertically oriented, concentric tubes, an external tube 607 and an internal tube 606. The internal tube 606 can define the internal chamber 104 for an upflow of fluid and the external tube 607 can define an external chamber 605 for a downflow column of fluid. The external tube 607 can be closed in its upper part, above the open upper end of the internal tube 606, such that the external chamber 605 can be substantially closed and isolated from the atmosphere.

The installation 600 can include an inlet 608 for introducing the aqueous effluent 616 to be treated, which can be positioned at or near the bottom of the internal chamber 604. The installation 600 can include an outlet 609 for transitioning the aqueous phase at the top of the external chamber 605 to a photobioreactor 680. An inlet 640 can be configured for injecting and distributing a gas phase, such as pressurized air, into the internal tube 606, where the inlet 640 can be connected to a source of pressurized gas (not shown). An outlet 611 for removing the offgas stream can be provided, where the offgas stream can be enriched with gaseous compound previously dissolved in the aqueous effluent. The offgas stream can be connected to an aspiration system 682 that can include an air pump 625. The installation 600 can facilitate the treatment of the aqueous effluent 616 by removing undesirable dissolved gaseous compound(s), such as oxygen, by separating the compounds at least partially from the aqueous effluent 616. The installation 600 can further facilitate treatment of the aqueous effluent 616 by incorporating the photobioreactor 680. Once the compounds are at least partially, substantially, or wholly removed, the aqueous solution can be returned to, for example, an aquaculture bath or alga-culture raceway. As illustrated, the photobioreactor 680 can have a serpentine configuration or any other configuration.

With reference to FIG. 8, an upflow liquid column of aqueous effluent 616 can be established in the internal chamber 104. An inlet 640 can be used to inject air or gas into the internal chamber 604, where the gas provided through the inlet 640 can be poorer in an undesirable compound than the aqueous effluent 616. For example, the gas coming through the inlet 640 can include pressurized air or carbon dioxide, where the inlet 640 can distribute the gas to the internal chamber 604 in the form of bubbles (not shown) such that the volume of the bubbles can increase as they move upward through the internal chamber 604. In this manner, a substantially homogeneous mixed liquid/gas stream 684 can be obtained at about the top of the installation 600. The mixed liquid/gas stream 684 can be separated into a liquid stream, constituting a downflow liquid column in the external chamber 605, obtained by overflow of the abovementioned mixed stream above the edge or high point of the internal tube 606. The mixed liquid/gas stream can also be separated into the outlet 611 enriched with the undesirable gaseous compound from the aqueous effluent for removal.

In one embodiment of the installation 600, in the upper part of the external chamber 605, a gas headspace 620 can be established between the liquid stream and the gas stream, corresponding to the separation of the mixed liquid/gas stream 684. The gas headspace 620 can be under vacuum because of the aspiration of the gas stream by the air pump 625, in one embodiment. In this manner, the vacuum column can operate like a siphon, as shown in FIG. 8, with the internal tube 606 being internal, and the external tube 607 being external. It will be appreciated that the relationship and function of the downflow and upflow columns can be reversed in an alternate embodiment. The installation 600 can include the following features, which can be considered separately or in combination with one another. The aqueous effluent 616 can be introduced at the bottom of the internal tube 606 and the initially treated aqueous phase can proceed from the external tube 607 into the photobioreactor 680.

Still referring to FIG. 8, it will be appreciated that any suitable photobioreactor 680 is contemplated. The photobioreactor 680 can be a vertically or horizontally configured assembly that can provide bacterial degradation and algae photosynthetic assimilation of suspended and dissolved minerals and/or nutrients in the water being treated. The installation 600, including a photobioreactor 680 can provide a low energy, sustainable method for water treatment and reuse. Example embodiments can have a relatively small physical footprint, can be relatively easy to protect from environmental damage, and can offer improved performance as a result of optimized solar insolation. Example embodiments can diminish seasonal variation in solar insolation and can improve performance as a result of optimized gas injection. The synergistic integration of the photobioreactor 680 can increase the flexibility in selecting the physical configuration of the installation 600 and can allow for optimization of the total system function.

Figure 9:
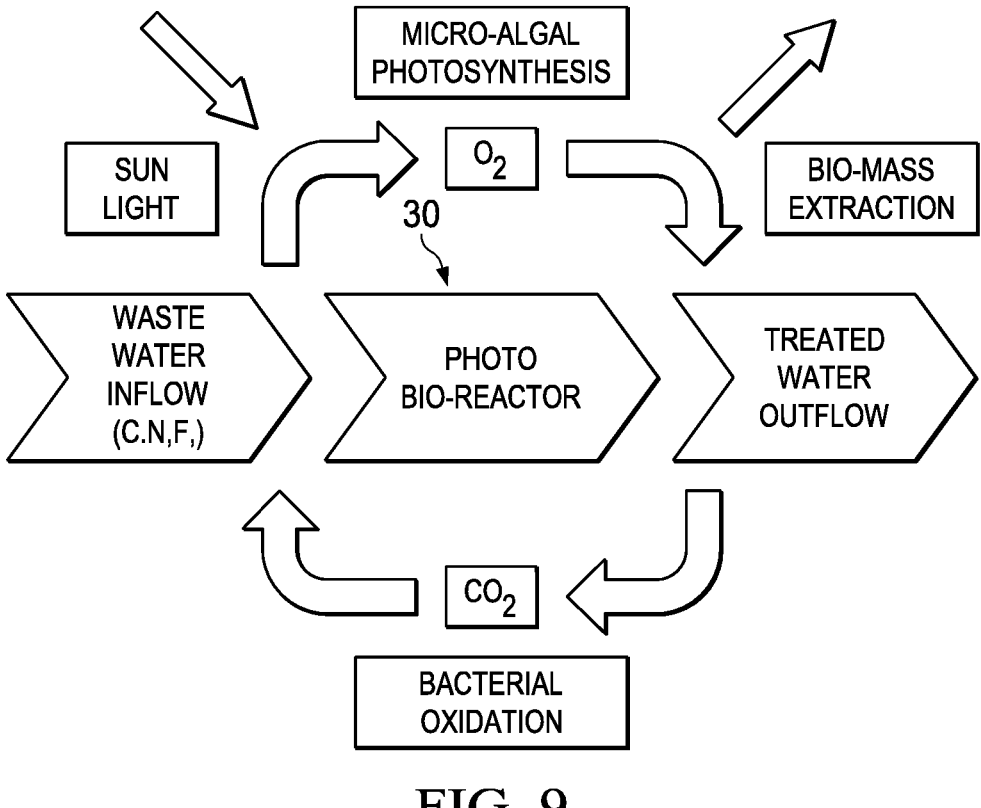
FIG. 9 is a schematic illustration of the operative cycle of the photobioreactor shown in FIG. 8.

In the illustrated embodiment of FIG. 8, the external chamber 605 can transition to a photobioreactor 680 that is vertically oriented. The external tube 607 can be fluidically coupled with the photobioreactor 680 and can return to the tank and/or inlet 608. The photobioreactor process according to one embodiment is illustrated in the block diagram shown in FIG. 9. The photobioreactor 680 can replace the traditional secondary through quaternary sewage management processes with a single, simpler process. The flow from the external tube 607, which can contain the nutrients carbon, nitrogen, and phosphorous along with other contaminants, can flow into the photobioreactor 680. In the photobioreactor 680, a synergistic process that can include micro-algal photosynthesis and bacterial oxidation can occur. Using the incoming flow from the external tube 607, sunlight, and $CO_2$ produced by the bacteria, algae associated with the photobioreactor 680 can produce biomass and oxygen. The bacteria using the oxygen produced by the algae can digest or breakdown the compounds in the waste stream. This process can continue until the nutrients have been converted to biomass. This process may be beneficial in the neutralization of pathogens such as fecal coliforms by using the combination of exposure to sunlight, higher oxygen levels, and higher pH levels that may be inherent in the process. The process may also be beneficial as metals can be absorbed by the biomass.

Figure 10:
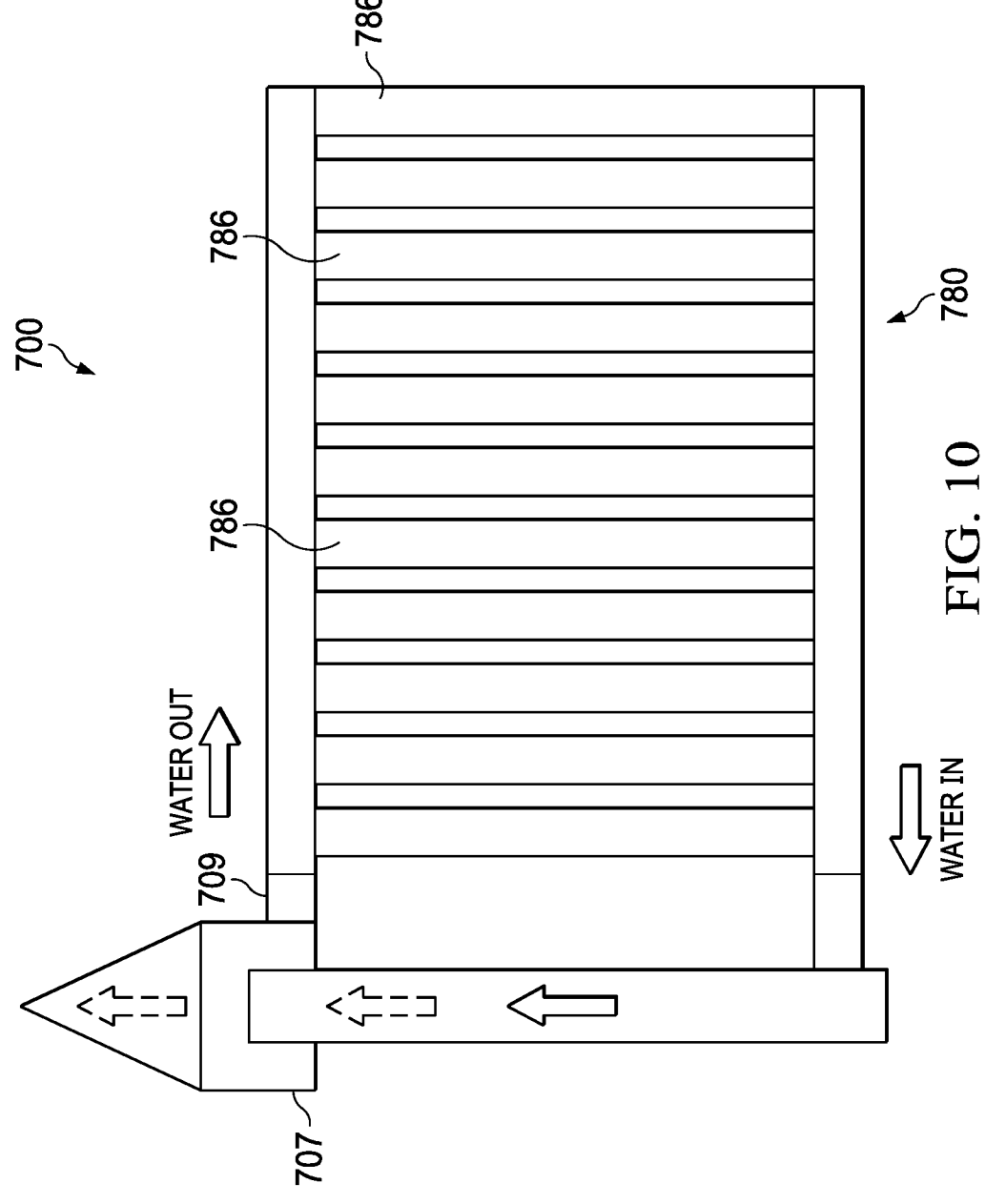
FIG. 10 is a schematic illustration of an installation associated with a photobioreactor for treating an aqueous effluent according to an alternate embodiment.

Referring to FIG. 10, an alternate embodiment of an installation 700 is showing with a photobioreactor 780 according to one embodiment. Tubes 786 within the photobioreactor 780 can be oriented vertically as shown, horizontally, or in a combination thereof to optimize water flow with respect to pressure drop characteristics. Although the photobioreactor 780 is shown associated with an outlet 709 positioned at about the top of the installation 700, it will be appreciated that any other suitable position is contemplated. For example, the outlet 709 can be positioned at lower positions on the external tube 707 to optimize system flow versus pressure characteristics.

Figure 11:
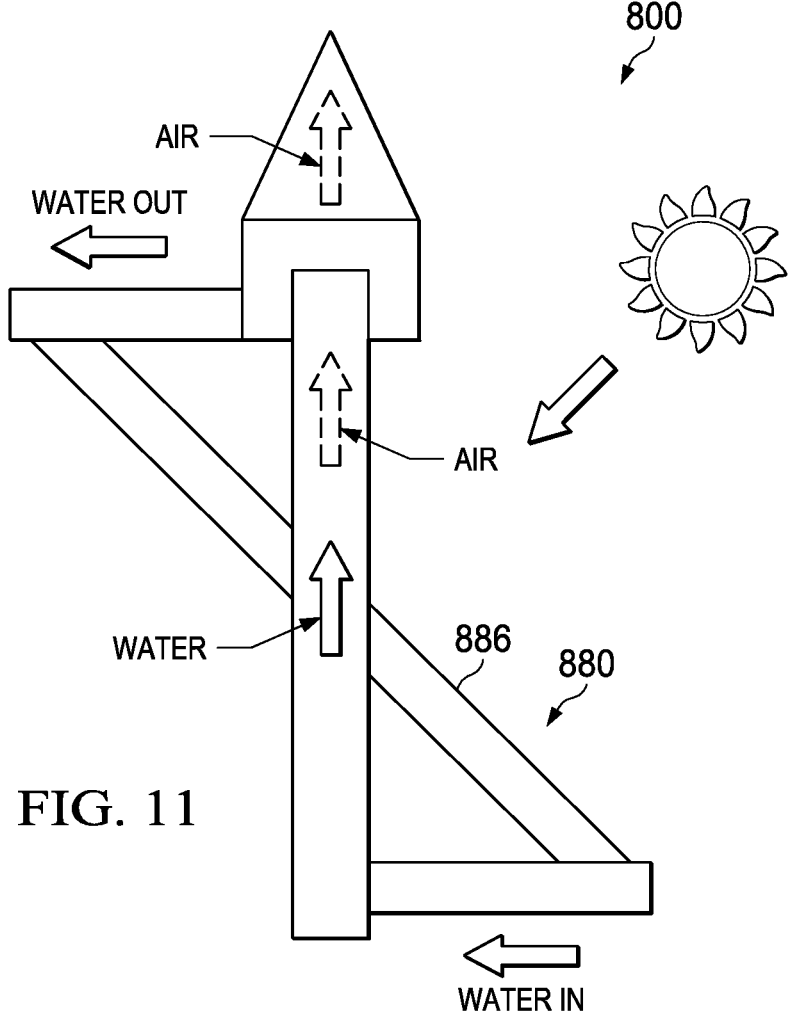
FIG. 11 is a schematic illustration of an installation associated with a photobioreactor for treating an aqueous effluent according to an alternate embodiment.

Referring to FIG. 11, an alternate embodiment of an installation 800 is showing with a photobioreactor 880 according to one embodiment. One or a plurality of tubes 886 associated with the photobioreactor 880 can be oriented at an angle as shown to facilitate exposure to light or solar rays. The photobioreactor 880 can be positioned at any suitable angle for maximum solar insolation such as from about 30 degrees to about degrees, from about 10 degrees to about 85 degrees, from about 25 degrees to about degrees, or any other suitable angle.

Versions of installations or assemblies can be constructed as a closed loop to limit evaporation and limit potential contamination. Some embodiments can include the counter flow injection of gases, which can be performed at a point above the base level to reduce compressor power requirements as a result of partial vacuum conditions. Embodiments can be optimized for seasonal consistency of solar insolation. Embodiments can have the ability to maximize solar insolation per unit of area. Embodiments can have the ability to inject counter flow gases as they are depleted to optimize dissolution efficiency. Embodiments can provide a relatively smaller footprint yielding improved space efficiency.

Embodiments can have the ability to incorporate a protective cover without restricting solar insolation. The protective cover can prevent snow or ice accumulation on the photobioreactor tubes, can prevent hail damage, and can help keep birds and other animals away from the system to reduce the potential for environmental damage. Embodiments can optimize water circulation, gas exchange, biomass extraction, bacterial oxidation, photosynthetic assimilation, and water purification functions to provide improved energy efficiency. It will be appreciated that the installations described herein associated with photobioreactors can be used with any suitable VAL system. Example embodiments can provide the capability to independently control water circulation rate and particle extraction rate for a VAL system.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation. Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

In various embodiments disclosed herein, a single component can be replaced by multiple components and multiple components can be replaced by a single component to perform a given function or functions. Except where such substitution would not be operative, such substitution is within the intended scope of the embodiments.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A vacuum airlift system for treating an aqueous effluent comprising:

a. an upflow liquid column, the upflow liquid column having a top and a bottom, a vertical orientation, a diameter, and a height, wherein the upflow liquid column is configured to retain a fluid;

b. a fluid inlet, the fluid inlet being fluidly coupled with the upflow liquid column, wherein the fluid inlet is positioned at about the bottom of the upflow liquid column;

c. a downflow liquid column, the downflow liquid column having a top and a bottom, a vertical orientation, a diameter, and a height;

d. a fluid outlet, the fluid outlet being fluidly coupled with the downflow liquid column, wherein the fluid outlet is positioned at about the bottom of the downflow liquid column; and e. a plurality of aerators fed by one or more fluidic oscillators, wherein the plurality of aerators being coupled to the upflow liquid column;

wherein the upflow liquid column is co-axial with the downflow liquid column.

2. The vacuum airlift system of claim 1, wherein the diameter of the downflow liquid column is greater than the diameter of the upflow liquid column.

3. The vacuum airlift system of claim 1, wherein the height of the upflow liquid column is greater than the height of the downflow liquid column.

4. The vacuum airlift system of claim 1, wherein the one or more fluidic oscillators are positioned within a porous cylindrical diffuser to create a continuous flow bi-stable valve micro bubble generator that eliminates parasitic losses associated with flow management for separate diffusers.

5. The vacuum airlift system of claim 1, further comprising a biological filter positioned in the upflow liquid column or the downflow liquid column, the biological filter being operably configured to facilitate a biological or chemical process.

6. The vacuum airlift system of claim 1, wherein the plurality of aerators comprises a first aerator having a control valve.

7. The vacuum airlift system of claim 1, wherein the plurality of aerators comprises a first aerator, wherein the first aerator is a micro-bubble aerator fluidly coupled with the upflow liquid column.

8. The vacuum airlift system of claim 7, wherein the plurality of aerators further comprises a second aerator, wherein the second aerator is a macro-bubble aerator fluidly coupled with the upflow liquid column.

9. The vacuum airlift system of claim 8, wherein the first aerator is positioned above the second aerator in the upflow liquid column.

10. The vacuum airlift system of claim 1, further comprising a low-pressure differential diffuser in conjunction with the one or more fluidic oscillators.

11. The vacuum airlift system of claim 1, further comprising a gas headspace above the top of the upflow liquid column, an offgas stream fluidly coupled with the gas headspace, and a vacuum pump, wherein the vacuum pump is operably configured to create a vacuum in the gas headspace.

12. A vacuum airlift system for treating an aqueous effluent comprising:

a. an upflow liquid column having a top and a bottom, a vertical orientation, a diameter, and a height, wherein the upflow liquid column is configured to retain a fluid;

b. a fluid inlet, the fluid inlet being fluidly coupled with the upflow liquid column, wherein the fluid inlet is positioned at about the bottom of the upflow liquid column;

c. a first aerator, the first aerator being fluidly coupled with the upflow liquid column, wherein the first aerator is operably configured to deliver a gas phase to the upflow liquid column such that a plurality of bubbles is formed within the upflow liquid column, wherein the first aerator is fed by a fluidic oscillator;

d. a downflow liquid column, the downflow liquid column having a top and a bottom, a vertical orientation, a diameter, and a height;

e. a fluid outlet being fluidly coupled with the downflow liquid column, wherein the fluid outlet is positioned at about the bottom of the downflow liquid column;

f. a gas headspace above the top of the upflow liquid column;

g. an offgas stream fluidly coupled with the gas headspace; and h. a vacuum pump, wherein the vacuum pump is operably configured to create a vacuum in the gas headspace;

wherein the upflow liquid column is co-axial with the downflow liquid column.

13. The vacuum airlift system of claim 12, wherein the diameter of the downflow liquid column is smaller than the diameter of the upflow liquid column.

14. The vacuum airlift system of claim 12, wherein the height of the upflow liquid column is greater than the height of the downflow liquid column.

15. The vacuum airlift system of claim 12, wherein the fluidic oscillator is positioned within a porous cylindrical diffuser.

16. The vacuum airlift system of claim 12, wherein the fluidic oscillator is positioned in a diffuser having a diffuser outlet, and wherein a vacuum or negative pressure at the diffuser outlet generates flow through the fluidic oscillator and improves fluidic oscillator stability.

17. The vacuum airlift system of claim 12, wherein the first aerator is a micro-bubble aerator.

18. The vacuum airlift system of claim 17, further comprising a second aerator, wherein the second aerator is a macro-bubble aerator fluidly coupled with the upflow liquid column.

19. The vacuum airlift system of claim 15, further comprising a biological filter positioned in the upflow liquid column or the downflow liquid column, the biological filter being operably configured to facilitate a biological or chemical process.

20. A vacuum airlift system for treating an aqueous effluent comprising:

a. an upflow liquid column, the upflow liquid column having a top and a bottom, a vertical orientation, a diameter, and a height, wherein the upflow liquid column is configured to retain a fluid;

b. a fluid inlet, the fluid inlet being fluidly coupled with the upflow liquid column, wherein the fluid inlet is positioned at about the bottom of the upflow liquid column;

c. a first aerator, wherein the first aerator is operably configured to deliver micro-bubbles to the fluid;

d. a second aerator, wherein the second aerator is operably configured to deliver macro-bubbles to the fluid;

e. a fluidic oscillator feeding the first aerator or the second aerator;

f. a downflow liquid column having a a top and a bottom, a vertical orientation, a diameter, and a height, wherein the diameter of the downflow liquid column is greater than the diameter of the upflow liquid column, wherein the height of the upflow liquid column is greater than the height of the downflow liquid column;

g. a fluid outlet, the fluid outlet being fluidly coupled with the downflow liquid column, wherein the fluid outlet is positioned at about the bottom of the downflow liquid column;

h. a gas headspace above the top of the upflow liquid column, wherein the gas headspace is defined at least partially by a cap;

i. an offgas stream fluidly coupled with the gas headspace;

j. a vacuum pump, wherein the vacuum pump is operably configured to create a vacuum in the gas headspace; and k. an evacuation tank associated with the offgas stream:

wherein the upflow liquid column is co-axial with the downflow liquid column.

* * * * *